Jan. 19, 1943.    M. CARTER    2,308,971
MOLD FILLING METHOD AND APPARATUS FOR PERFORMING SAME
Filed Aug. 2, 1941
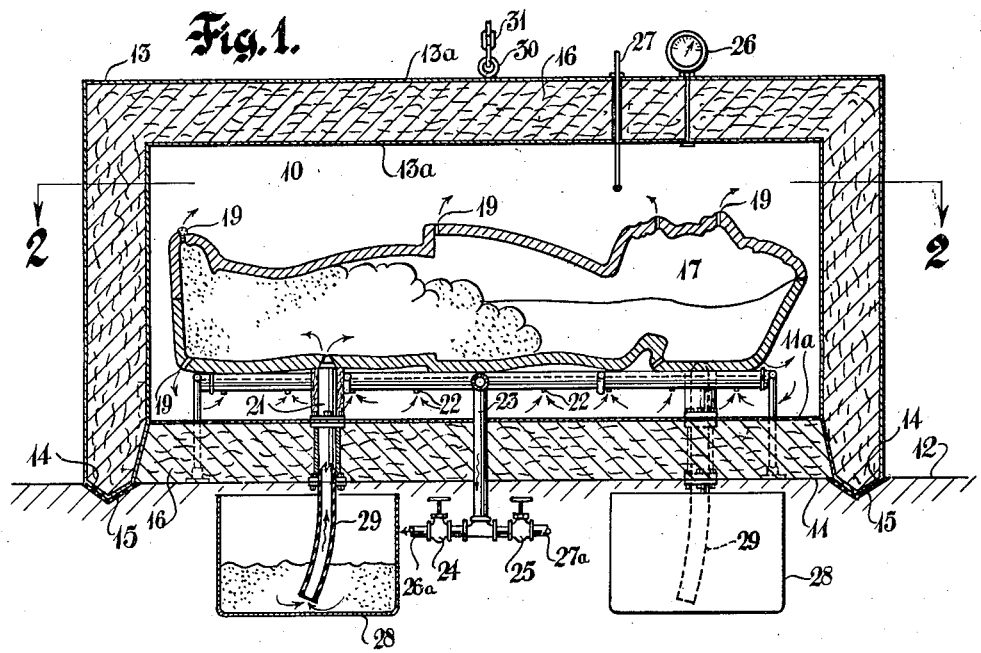
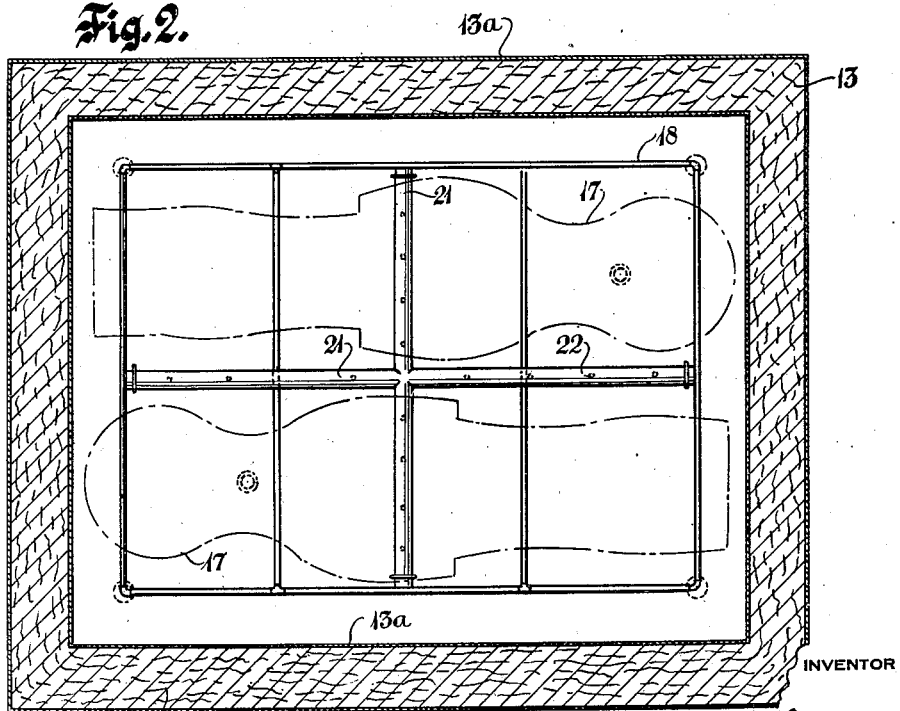
INVENTOR
Mitchell Carter
BY
ATTORNEYS Patented Jan. 19, 1943

2,308,971

UNITED STATES PATENT OFFICE 2,308,971

MOLD FILLING METHOD AND APPARATUS FOR PERFORMING SAME

Mitchell Carter, Yardley, Pa., assignor to The Firestone Tire & Rubber Company, Akron, Ohio, a corporation of Ohio Application August 2, 1941, Serial No. 405,211

5 Claims. (Cl. 18—30)

The present invention relates to filling molds, especially to filling molds with latex, and to apparatus for use in filling the molds and for vulcanizing the latex in the molds.

Heretofore molds in which rubber articles are made directly from latex have usually been filled with latex and then inserted into a vulcanization chamber. This operation requires individual treatment of the molds and, when a plurality of small molded articles are made, the expense of mold filling, etc., is a large item in the total cost of the article formed. Then too, such mold filling methods involve appreciable waste, because the molds ordinarily would be filled to overflowing with the latex, or the mold would be substantially filled with latex and then, when a mold cover carrying pins or the like which extend into the mold would be applied to the mold, the latex would be forced from the mold due to the pins filling a portion of the mold cavity.

The general object of the present invention is to provide an improved, inexpensive, easily practiced, rapid mold filling method which can be performed with a minimum of labor.

A further object of the invention is to provide inexpensive, simply constructed apparatus for performing the method of the invention and for vulcanizing molded rubber articles.

The foregoing and other objects will be manifest from the following specification, which is described with particular reference to the accompanying drawing, in which:

Figure 1 is a vertical sectional view of apparatus embodying the invention and for practicing the method of the invention; and Figure 2 is a sectional view taken on line 2—2 of Figure 1, with the molds being dotted in position.

In its broadest aspect, the present invention comprises associating a mold for making a rubber article directly from latex with a volume of latex, which latex is usually under atmospheric pressure. Then, a slight vacuum is set up in the mold whereby the latex is caused to flow into the mold and fill same completely, after which the molded latex is gelled and vulcanized in any suitable manner. Apparatus for practicing the method of the invention, including light weight means for forming a vulcanization chamber also are covered by the invention.

It will be appreciated that "latex" in the present application is used in its broadest sense and covers all dispersions of rubber and rubber-like substances, although natural rubber latex is that normally used.

Referring specifically to the drawing, a vulcanization chamber 10 is shown, which chamber is made from a base member 11 carried on a support 12, and a cover 13. The cover 13 is adapted to abut and engage with the ends and the sides of the base member 11 and seat on V-shaped recesses 14 formed in the support 12. Suitable gaskets 15 may be mounted in the recesses 14 to seal the joint between the cover 13 and the support whereby an airtight vulcanization chamber is formed. The base member 11 and cover 13 may be formed from any suitable material and in this instance are made of light material comprising a metallic inner wall 11a and a metallic inner and outer wall 13a, respectively, between which is positioned any suitable insulating material 16, such as rock wool. A mold 17 to be filled with latex to form a rubber article therefrom is positioned in the vulcanization chamber 10, being supported therein upon a substantially rectangular framework 18 which is associated with the base member 11 and carried by the support 12. Note that the mold 17 is provided with a plurality of vents 19 at the portion thereof most apt to trap air in the mold, whereby all air can be exhausted from the mold when it is to be filled. Pipes 21 are positioned immediately below the frame 18 and form a T-shaped member that extends substantially the length and width of the vulcanization chamber. These pipes 21 have vents or apertures 22 formed on their lower surface for a purpose hereinafter to be explained. A pipe 23, extending through the base member 11 and connecting through valves 24 and 25 to pipes 26a and 27a, respectively, connects to the pipes 21 and supports them in the vulcanization chamber. The pipe 26a extends to a suitable vacuum source (not shown), while the pipe 27a connects to a suitable source (not shown) of steam. Hence, the pipes 21 and the pipe 23 can be used to set up a vacuum, or a vulcanization temperature in the vulcanization chamber 10, depending on which of the valves 24 or 25 is open.

The mold 17 is connected to an open tank 28 by a pipe, or hose 29 which extends through the base member 11. The tank 28 serves as a receptacle in which latex used in making the rubber articles is stored. Preferably the pipe 29 is formed in a plurality of sections to facilitate the cleaning of same, or may be of such construction, i. e., split and telescoped, in order to simplify further the cleaning thereof.

It will be seen that when valve 25 is closed and valve 24 is open a vacuum will be set up in the vulcanization chamber 10 and within the mold 17. Since the latex in the tank 28 is under a pressure, usually atmospheric, latex will be drawn up or forced through the pipe 29 into the mold 17 until same is filled. Preferably, the mold is heated prior to drawing latex thereinto, so that the heat of the mold acts to gel latex positioned therein. As long as the mold filling operation is taking place and the latex is in motion, it does not have a tendency to gel, permitting the latex to be drawn into the mold so as to fill same completely, but gelling after, or as it is passing through the vents 19 to prevent latex from being spewed from the mold. In some cases it may be sufficient to compound delayed action gelling agents with the latex to effect the desired gellation of the latex.

The vulcanization chamber cover 13 has a gauge 26 extending therethrough to show the pressure of the vulcanization chamber and a thermometer 27 also is associated with the chamber whereby the temperature within the vulcanization chamber can be read from the outside thereof. Obviously, the vulcanization chamber can be of any size desired, although in this instance it is shown as being adapted to take only two molds at one time, each mold being fed directly from a latex storage tank. In the production of large quantities of small rubber articles, it is possible to form 50 to 100 articles or more at one time by connecting each individual mold to an individual, or a common latex storage tank. A feature of the invention is that all of the molds can be filled at the same time by setting up a vacuum in the vulcanization chamber.

The present invention is particularly adapted to the production of cellular rubber articles from latex. In that instance, the vacuum set up on the latex may act to expand the latex foam slightly as it is drawn into the molds. When starting with a warm mold, the surface of the latex foam coming into contact with the mold is the only portion of the foam gelled immediately, so that when the vacuum is released the remainder of the foam returns to its normal size.

The latex used in practice of the invention preferably is compounded with a blowing agent, such as baking powder, so that there is a volume of gas released in the latex when the latex is positioned in a warm mold, as disclosed more fully in my copending application Serial No. 330,541, filed April 19, 1940, now Patent No. 2,290,622. Here the baking powder or other blowing agent sets up a pressure in the latex foam which would counteract any tendency of the foam to collapse when the vacuum thereon, used to draw it into the mold, is released. Heat-sensitized latex preferably is used in practice of the invention.

It has been determined that only a slight vacuum is required in the chamber 10 in order to draw materials into the molds. That is, a vacuum of from one-half to two inches of mercury may be established in the chamber and that will function to draw latex into the molds very satisfactorily.

Obviously any of several methods can be used to determine when the molds are filled with latex. For example, a predetermined volume of latex could be placed in the tanks and the entire volume thereof be drawn into the mold, or the quantity of latex in the tank could be measured continuously and when no further latex is being drawn therefrom, it could be assumed that the molds were filled and no more latex could be drawn therein due to the vents 19 being filled with gelled latex.

An eyelet 30 is secured to the cover 13 of the vulcanization chamber and suitable means, such as a chain 31, are engaged therewith for raising the cover 13 from the support 12 to allow access to the molds 17. It has been pointed out that the cover 13 is of light construction, so that it is adapted to be moved, whereas the mold 17 can be allowed to remain stationary. Since molds used in forming large cellular rubber articles, such at mattresses, are quite heavy, it would be appreciably easier to move the vulcanization chamber cover than to move the molds. Hence, the molds could be completely processed while remaining upon the frame 18 and the molds could be within the vulcanization chamber substantially the entire time. This aids in maintaining the temperature of the molds and prevents failures caused by variations in the mold temperature. That is, the molds could be positioned within the chamber 10, and steam or hot air fed into same by opening valve 25 until all of the molds are at the desired (and uniform) temperature. Then the valve 25 would be shut off and the valve 24 would be opened to draw latex into the molds without moving same from the vulcanizing chamber. After the molds are filled, the valve 24 should be closed and the valve 25 gradually opened to fill the chamber 10 with steam to vulcanize the rubber in the molds. Use of the apparatus of the invention requires only the bowl or other light weight means carrying the latex to be moved to fill the latex storage tanks.

In view of the foregoing, it will be seen that a novel, easily practiced method requiring a minimum of labor, has been provided for filling molds with latex, and the objects of the invention have been achieved.

While one embodiment of the invention has been completely illustrated and described herein, it will be appreciated that modifications hereof may be made without departing from the scope of the invention as defined in the appended claims.

What is claimed is:

1. A method of producing molded rubber articles from latex, comprising setting up a vacuum in an inclosed vulcanizing chamber having a vented mold positioned therein, drawing latex into the mold by means of the vacuum, and gelling and vulcanizing the latex in the mold to produce a molded rubber article.

2. A method of manufacturing molded sponge rubber articles from a rubber dispersion, including the steps of setting up a vacuum in a mold, drawing foamed rubber dispersion into the mold by means of the vacuum, and gelling and vulcanizing the foamed rubber dispersion in the mold to produce a molded sponge rubber article.

3. Apparatus for producing rubber articles from latex, said apparatus comprising a base member, a cover member removably engaged with said base member to form a vulcanization chamber therewith, a support associated with said base member and extending into the vulcanization chamber, a mold carried on said support, means outside the vulcanization chamber immediately adjacent said support for storing latex, means connecting said mold to said latex storage means, vacuum producing means connected to said mold to set up a slight vacuum therein to draw latex thereinto, and means for heating said vulcanization chamber to vulcanize any rubber therein.

4. Apparatus for producing rubber articles from latex, said sapparatus comprising a base member, a cover member removably engaged with said base member to form a vulcanization chamber therewith, a vented mold associated with said vulcanization chamber, means outside said vulcanization chamber for storing latex, means connecting said mold to said latex storage means, vacuum producing means associated with said vulcanization chamber to set up a slight vacuum therein to draw latex into said mold, and means for heating said vulcanization chamber to vulcanize any rubber contained in said mold.

5. In a method for producing rubber articles, the steps of placing a mold in a closed vulcanizing chamber, heating the chamber until the mold is at the desired temperature, setting up a vacuum in the mold, drawing a rubber dispersion into the mold by means of the vacuum, and gelling and vulcanizing the dispersion in the mold without removing the mold from the chamber.

MITCHELL CARTER.